Patented Nov. 14, 1933

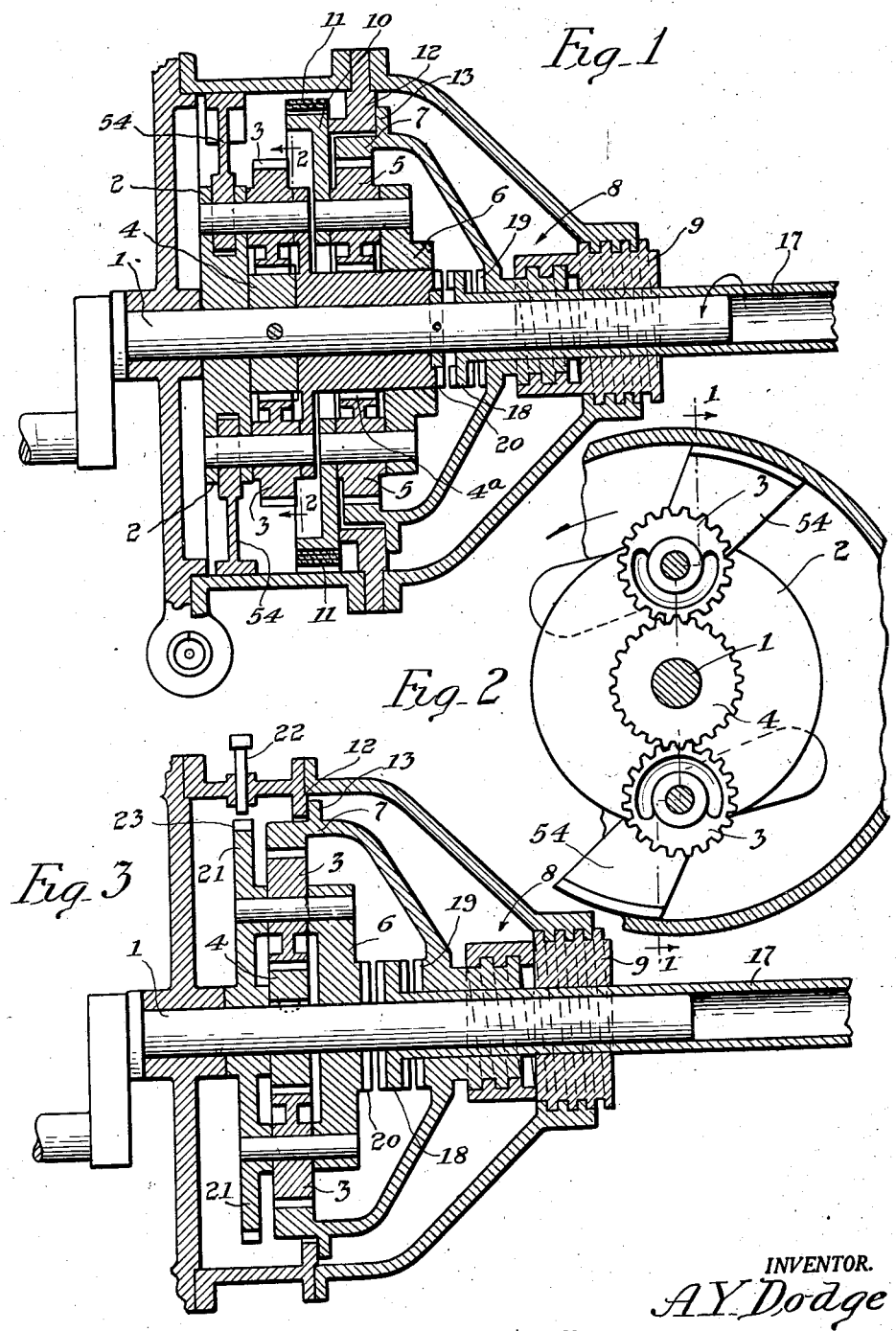

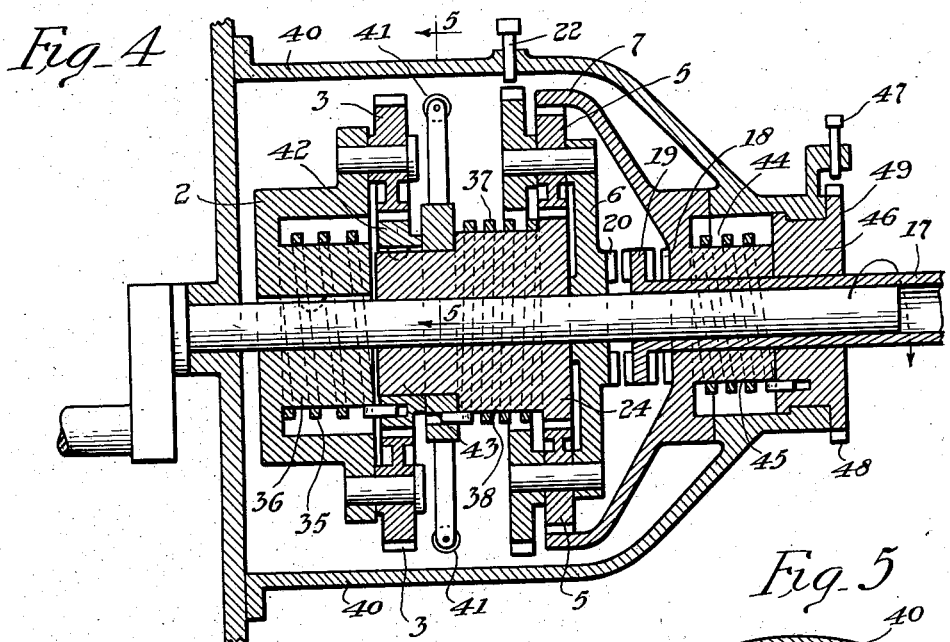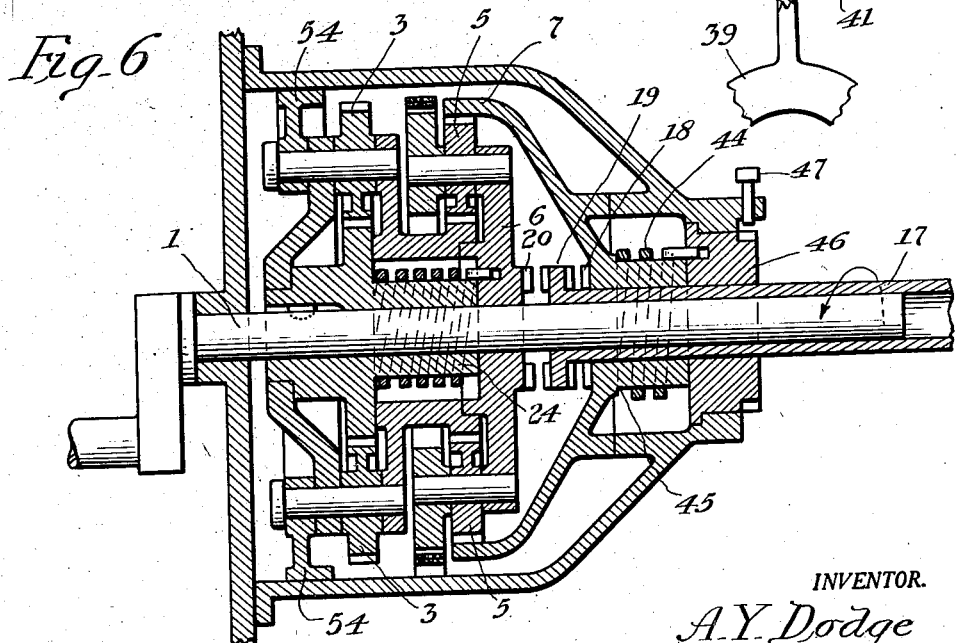

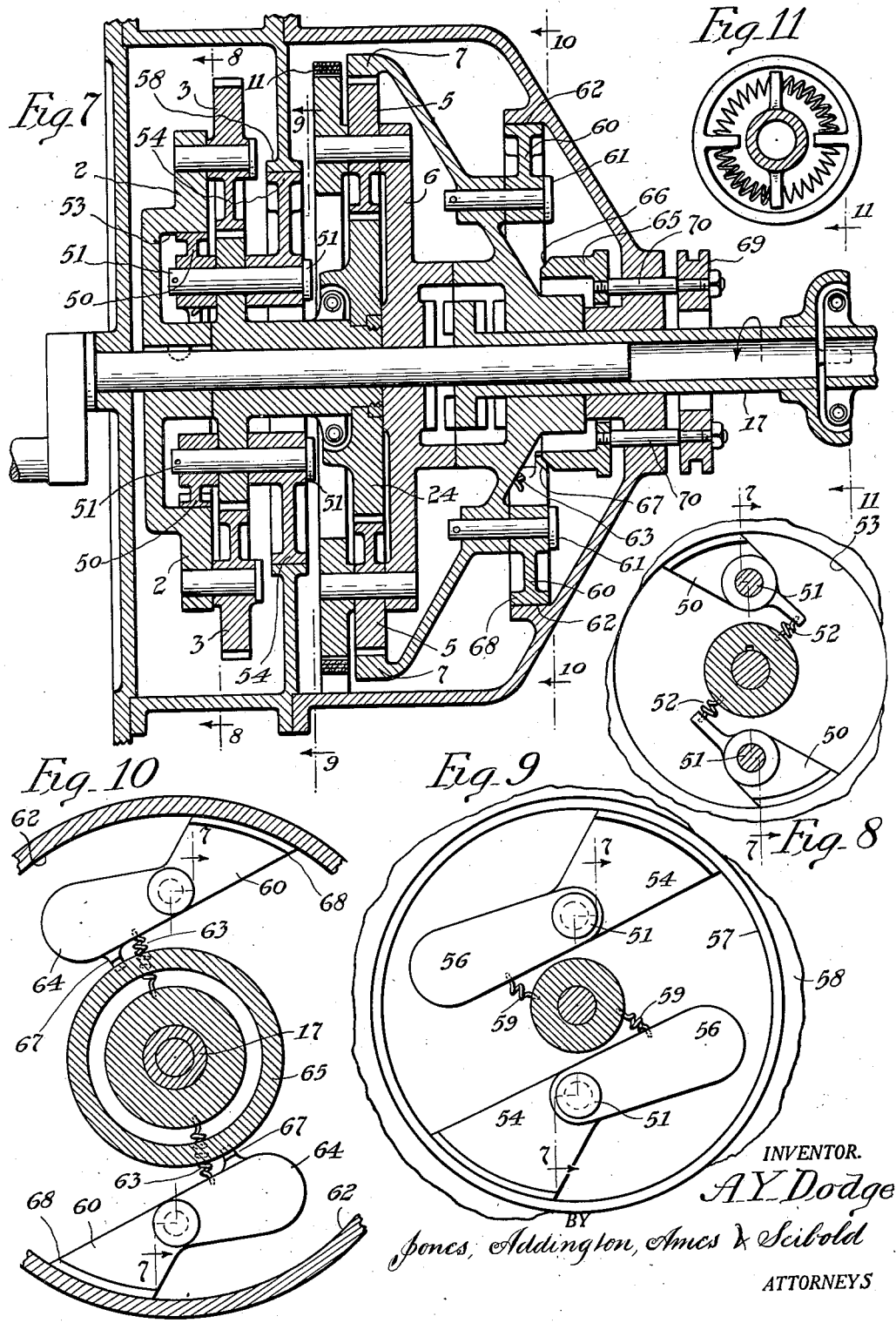

1,935,589

UNITED STATES PATENT OFFICE 1,935,589

TRANSMISSION

Adiel Y. Dodge, South Bend, Ind.

Application July 16, 1932. Serial No. 622,852

27 Claims. (Cl. 74—34)

My invention relates to transmissions. More specifically it relates to transmissions for use between the motor of an automobile and the propeller shaft.

One of the objects of my invention is to simplify the control and action of an automobile transmission.

A further object is to provide an improved transmission in which in a general way acceleration is secured, without shifting of gears, solely by depressing the accelerator.

A further object of my invention is to provide an improved transmission in which the pick-up will be smooth and powerful.

A further object is to provide a transmission in which a modified engine-braking action and a modified free-wheeling action is obtained.

Further objects will appear from the description and claims.

In the drawings in which several forms of my invention are shown:

Figure 1 is an axial section of one form of transmission;

Fig. 2 is a section on the line 2—2 of Fig. 1;

Fig. 3 is an axial section of another form of transmission;

Fig. 4 is an axial section of another form of transmission;

Fig. 5 is a section on the line 5—5 of Fig. 4;

Fig. 6 is an axial section of another form of transmission;

Fig. 7 is an axial section of another form of transmission;

Fig. 8 is a section on the line 8—8 of Fig. 7;

Fig. 9 is a section on the line 9—9 of Fig. 7;

Fig. 10 is a section on the line 10—10 of Fig. 7; and

Fig. 11 is a section of yielding coupler used in Fig. 7.

Referring to the drawings in detail and first to Figure 1, the construction shown therein comprises a crank shaft 1 (which may be that of an internal combustion engine for automobiles), a one-way centrifugal clutch (comprising a gear carrier 2 on the crank shaft 1 and a pair of weighted planetating gears 3 mounted thereon), a sun gear 4 through which an extension of the crank shaft extends and with which the planetating gears mesh, a pair of weighted planetating gears 5 meshing with and driven by the sun gear 4a, a gear carrier 6 on which these planetating gears are mounted, a ring gear 7 meshing with and driven by these planetating gears 5, a one-way reactance clutch 8 (of the expanding screw type) normally preventing reverse rotation of the ring gear (but permitting forward rotation thereof), and a screw-threaded abutment 9 movable into and out of cooperative relation with respect to the one-way reactance clutch 8 whereby this clutch may be rendered ineffective in preventing reverse rotation of the ring gear when desired.

The construction also includes a brake drum 10 mounted to rotate with the gear carrier 6, a brake band 11 for holding this brake drum against rotation when desired and a friction ring 12 having one surface cooperating with a friction surface on the brake drum 10 and another surface cooperating with a friction surface on the flange 13 of the ring gear 7. The construction also includes a one-way reactance clutch 54 (see Fig. 9). The shoes 54 are set in such a direction that the disc 2 can precess in the forward direction only as indicated by arrow (Fig. 2) but such that the disc 2 cannot back up around shaft 17.

The screw-threaded connection between the ring gear 7 and the threaded sleeve of the reactance clutch 8 is in such direction as to permit the ring gear 7 to precess with respect to the threaded sleeve but such as to prevent the ring gear from backing up with respect to the threaded sleeve. Any tendency of the ring gear to back up would cause pressure to be exerted between two pairs of friction surfaces. One of these pairs of friction surfaces is between the threaded sleeve and the threaded abutment 9. The other pair is between the ring gear 7 and the friction ring 12.

Before describing the construction in further detail, I will outline briefly certain operations of the transmission.

I will assume, for the purposes of this description, that the transmission is to be used in driving an automobile, that the crank shaft 1 is the crank shaft of an engine, and that the hollow shaft 17 into which the extension of the crank shaft extends is connected with the propeller shaft. This hollow shaft may be shifted axially to bring the clutch member 18 into engagement either with the clutch teeth 19 on the ring gear for reverse or into engagement with the clutch teeth 20 on the gear carrier 6 for all forward speeds. It may be moved to the intermediate position shown in Fig. 1 for neutral.

For all forward speeds, the dog clutch is moved into engagement with the clutch teeth 20 on the gear carrier. The engine is then started and speeded up. As it speeds up, the weighted planetating gears 3 cooperating with the one-way reactance clutch 54 will cause the sun gear 4a to start to rotate and pick up in speed. As the threaded abutment 9 is in a position to cooperate with the threaded sleeve of the one-way reactance clutch 8, the ring gear 7 cannot back up and hence the gear carrier 6 is caused to rotate (at first at a lower speed than the sun gear) because of the engagement of the planetating gears 5 with the driving sun gear 4a and the stationary ring gear 7. In this forward drive, the brake band 11 is, of course, released to allow the brake drum 10 to rotate. As the gear carrier 6 picks up in speed, it will cause the ring gear 7 also to rotate in a forward direction because of the action of the weighted planetating gears 5 and the threaded sleeve of the one-way reactance clutch 8. As the speed of rotation of the gear carrier 6 increases still further, the speed of the ring gear 7 also will increase until at last it is rotating at the same speed as that of the gear carrier 6 which will then also be the same as the speed of the sun gear 4a, so that a one-to-one transmission is finally arrived at.

This construction provides for a substantially smooth pick up with increased torque between the crank shaft and sun gear 4 and with a still further increase of torque between the sun gear 4a and gear carrier 6. There is also a provision for torque increase between the sun gear 4 and ring gear 7 because of the threaded sleeve of the one-way reactance clutch 8.

For reverse, the threaded abutment 9 is moved by rotating it in the proper direction to a position in which it cannot be engaged by the threaded sleeve of the one-way reactance clutch 8 and the brake band 11 is tightened to hold the gear carrier 6 against rotation. When the engine is started and speeded up, the sun gear 4a will be given a rotation in a forward direction in the manner described in connection with the forward drive but as the gear carrier 6 is held against rotation, the ring gear 7 will be rotated in a reverse direction at a slower speed than the speed of rotation of the sun gear and this will drive the automobile backward (as the dog clutch 18 is, for this operation, connected with the clutch teeth 19 of the ring gear 7).

The construction of Fig. 3 is similar to that of Fig. 1 except that the centrifugal clutch construction ahead of the sun gear 4a and the one-way reactance clutch 54 for the sun gear are omitted. In this form the sun gear 4 is connected directly to the extension of the crank shaft 1. A different form of holding means for the gear carrier 6 is provided in the form of a peripherally-notched disc 21 which may be held against rotation by moving a detent 22 into engagement with the toothed periphery 23 of the disc 21. The action of the gear carrier 6, planetating gears 5, ring gear 7, one-way reactance clutch 8 and threaded abutment 9 is the same as that described in connection with Fig. 1.

The construction of Fig. 4 is the equivalent in many ways of the construction in Fig. 1 except that coil spring, one-way reactance clutches are used instead of expanding screw one-way reactance clutches. The gear carrier 2, planetating gears 3, double sun gear 24, planetating gears 5, gear carrier 6, gear carrier detent 22 and ring gear 7 may be substantially the same as in the form previously described. The forward direction of rotation is opposite in direction as shown in this figure.

The one-way clutch between the gear carrier 2 and the sun gear 24 comprises a coil spring 35 wound so as to snugly engage the drum portion 36 of the gear carrier 2 and extending in a direction which will permit the gear carrier 2 to precess with respect to the sun gear 24 but will prevent any backing up of the gear carrier 2 with respect to the sun gear 24. The one-way reactance clutch which prevents reverse rotation of the sun gear 24 comprises a coil spring 37 snugly engaging the drum portion 38 of the sun gear 24 and having one end secured to a yieldingly-held anchor ring 39. This anchor ring is yieldingly secured to the casing 40 by means of a coil spring 41, as shown in Fig. 5, this construction permitting the anchor ring 39 to yield somewhat when a rotational force is exerted thereon but preventing any substantial rotation thereof. The spring 37 is wound in such a direction as to permit free rotation of the sun gear 24 but to prevent any backing up of the sun gear with respect to the anchor ring 39 through which it extends. The double sun gear 24 is shown as made of two parts, the gear portion 42 of which is driven by the planetating gears 3 being keyed to the hub portion 43 of the sun gear 24.

The one-way reactance clutch which normally prevents reverse rotation of the ring gear 7 comprises a coil spring 44 snugly engaging the drum portion 45 of the ring gear 7 and having one end secured to an anchor ring 46, which anchor ring is held against reverse rotation for forward travel by means of a detent pin 47 movable into engagement with the toothed periphery 48 of the flange 49 of this anchor ring. The spring 44 is wound in such a direction as to permit free forward rotation of the ring gear 7 but such as to prevent any backing up of the ring gear with respect to the anchor ring 46. The action of this transmission is substantially the same as that of Fig. 3, the coil spring one-way clutches acting in the same manner as the expanding screw one-way clutches of Fig. 3. There is a slight difference in that the anchor ring 39 which prevents reverse rotation of the sun gear 24 is yieldingly held so that the reversely acting impulses of the weighted planetating gears 3 on the sun gear 24 may actually cause a slight reverse rotation of the sun gear 24 against the tension of the anchor springs 41, this tension of the spring, however, acting to reinforce the next forward impulse of the weighted planetating gears 3 on the sun gear. In this way the vibration due to negative impulses is smoothed out and made less objectionable. In Figure 1 the whole case may be mounted free to revolve on the axis of the shaft a few degrees against suitable spring tension, for the same purpose namely to deaden the effect of the negative impulses and to reinforce the next positive impulse.

The construction of Fig. 6 is similar to that of Fig. 1 except that the one-way clutch 44 is like the one-way clutch 44 of Fig. 4. The principal difference in operation between the form of Fig. 6 and Fig. 4 is that Fig. 4 would be capable of the modified free wheeling of Fig. 3, whereas Fig. 6 would not be capable of free wheeling but would have full engine braking action. In both forms, reverse is secured by releasing the anchor ring 46 to permit the ring gear 7 to rotate backward freely and holding the gear carrier 6 against rotation so that forward rotation of the sun gear 24 will cause reverse rotation of the ring gear 7, the hollow shaft 17 being connected to rotate with the ring gear 7 for reverse.

The construction of Figs. 7, 8, 9 and 10 is substantially similar in action as that of Figs. 3 and 4. In this form of Fig. 7, however, pivoted centrifugally-controlled one-way friction dog clutches are substituted for the expanding screw clutches and coil spring clutches of Figs. 3 and 4. Thus the one-way clutch construction between the gear carrier 2 and double sun gear 24 shown in Fig. 8 comprises a pair of friction dogs 50 pivoted on pins 51 on the sun gear 24 and designed so as to permit free precession of the gear carrier 2 with respect to the sun gear 24 but so as to prevent any backing up of the gear carrier with respect to the sun gear. Springs 52 may be provided to insure initial engagement of the friction dog clutches 50 with the internal friction surface 53 of the gear carrier 2.

The one-way reactance clutch construction for preventing reverse rotation of the sun gear, shown in Fig. 9, comprises a pair of one-way friction dog clutch members 54 pivoted on the pins 51 and provided with counterweights 56 so designed that when the sun gear 24 on which these dogs are pivotally mounted goes up to a certain speed, the friction dogs 54 will be moved out of engagement with the friction surface 57 of the friction ring 58 by the centrifugal action on these counterweights. A pair of light springs 59 may be provided to insure initial engagement of the friction dogs 54 with the internal friction surface of the friction ring.

The one-way reactance clutch construction for normally preventing reverse rotation of the ring gear shown in Fig. 10 comprises a pair of pivoted one-way friction dog clutches 60 pivotally mounted on studs 61 on the ring gear 7 and normally held in initial engagement with the internal friction surface 62 by means of a pair of light springs 63. This pair of friction dogs also, as in the pair shown in Fig. 9, is provided with counterweights 64 which move the friction dogs 60 out of frictional engagement with the friction surface 62 when the ring gear 7 reaches a certain speed.

It is necessary during intermediate speeds for the one-way reactance clutches used herein, as shown in Figs. 1, 2, 3, 4, 6, 9 and 10, to hold their respective members against reverse movement at every negative impulse and allow them to move ahead again at the time of positive impulses, which may recur in the neighborhood of six hundred times per minute under certain conditions of load and speed ratio. Therefore, it is necessary to provide a one-way clutch having an infinite number of holding positions thereon. My one-way clutches perform two functions: they act as back stops during positive gear ratios, i. e., when ring gear stands still, and they act as infinite position negative impulse absorbing members during times when the ring gear is precessing.

In order to render these friction dogs inoperative in preventing reverse rotation of the ring gear when it is desired to back up, a control ring 65 is provided, which may be shifted axially and which has a conical surface 66 engageable with fingers 67 on the friction dogs 60. When this control ring is moved to the left, as viewed in Fig. 7, the conical surface 66 will force the fingers 67 on the friction dogs 60 outwardly, moving the arcuate friction shoes 68 inwardly, thus preventing their engagement with the friction surface 62. The slidable movement of the control ring 65 or sleeve is effected by means of a grooved shifting ring 69 secured to the slides 70 on which the control ring 65 is mounted.

The operation and action of this form is substantially the same as that of Figs. 3 and 4, a modified free wheeling being obtainable but with powerful engine braking action at high speeds of the gear carrier 6.

In this form, it will be noted that when the sun gear and ring gear are rotating above a certain speed, the friction clutch shoes 54 and 60 will be out of frictional engagement with the annular friction surfaces 57 and 62, thus preventing any dragging action on the transmission.

The main purpose of the one-way clutch construction between the gear carrier 2 and the sun gear in these constructions is to prevent precession of the sun gear with respect to the gear carrier when the engine is decelerating. If still further free wheeling action were desired, this one-way clutch construction could be omitted, and a modified free wheeling action would be obtainable both between the sun gear and the gear carrier 2 and between the gear carrier 6 and sun gear.

The main purpose of the one-way reactance clutches 54 and 37 is to absorb the negative or reverse impulses and provide an increase in torque between the engine crankshaft and the sun gear, this construction enabling torque increases in series,—(1) between the engine crank shaft and sun gear; (2) between the sun gear and planetating gears 5, and (3) between the planetating gears 5 and the ring gear 7, the one-way reactance clutches 8—44 and 60 controlling the rotation of the ring gear. This one-way reactance clutch (preventing reverse rotation of the sun gear) also cooperates with the one-way reactance clutch controlling the ring gear to provide a "no-back" construction which will prevent the car from rolling backward on a grade when the engine is running slowly or standing still, by automatically going into the positive "low" gear, i. e. largest gear reduction.

This application is a continuation in part as to common subject matter of my copending application Serial No. 532,231, filed April 23, 1931. The claims covering broadly the arrangement in an automatic transmission of the above-described types of surface-engaging friction one-way clutch means are not contained herein, as that subject-matter is claimed in my application No. 693,569 filed October 14, 1933, which as to that subject-matter is a partial continuation of the present application, which has been restricted to matter not disclosed in said partial continuation application.

While several embodiments of the present invention have been shown and described herein, it will be understood that various changes and modifications in the details of structure and arrangement of the parts may be made without departing from the spirit and scope of the invention. These embodiments of the invention having been shown and described, therefore, what is claimed as new is:

1. An automobile transmission for use between the crank shaft of an internal combustion engine and the propeller shaft, comprising centrifugal impulse driving means, including a driving member rotatable with the crank shaft having a driving action increasing with the engine's speed and a driven member, and having provisions for preventing the driven member from overrunning with respect to the driving member whereby, when the crank shaft decelerates, it will act to retard the driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, a second overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said second overrunning clutch means ineffective in preventing reverse rotation of the reversible gear, whereby when the crank shaft rotates the sun gear will, because of the first centrifugal impulse driving means, tend to pick up in speed until it reaches the speed of the centrifugal impulse driving means, and whereby, when the sun gear is driven, the reversible gear held against reverse rotation, and the planetary gearing freed for rotation, the planetary gearing may be positively driven at a lower speed than the sun gear if the reversible gear is stationary and whereby the second centrifugal impulse driving means will tend to cause the reversible gear to pick up in speed until it reaches the speed of the planetary gearing, and hence of the sun gear, and whereby, when the crank shaft and sun gear are decelerated, the second centrifugal impulse driving means will exert a decelerating action on the planetary gearing, and hence of the reversible gear, which decelerating action decreases as the speed of the planetary gearing decreases, whereby a modified free-wheeling of the planetary gearing, and reversible gear, is obtained and whereby, when the sun gear is driven, the reversible gear freed for reverse rotation, and the planetary gearing held against reverse rotation, the reversible gear will be positively driven in a reverse direction at a lower speed than the sun gear.

2. An automobile transmission for use between the crank shaft of an internal combustion engine and the propeller shaft, comprising a sun gear, a planetary gearing meshing with the sun gear, a reversible gear meshing with said planetary gearing, the transmission between the planetary gearing and the reversible gear including centrifugal impulse driving means having a driving action on the reversible gear varying with the speed of the planetary gearing, overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said overrunning clutch means ineffective in preventing reverse rotation of the reversible gear, said overrunning clutch means comprising a member having a spiral engagement with respect to the reversible gear and coaxial therewith.

3. An automobile transmission for use between the crank shaft of an internal combustion engine and the propeller shaft, comprising centrifugal impulse driving means, including a driving member rotatable with the crank shaft having a driving action increasing with the engine's speed and a driven member, and having provisions for preventing the driven member from overrunning with respect to the driving member whereby, when the crank shaft decelerates, it will act to retard the driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, a second overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said second overrunning clutch means ineffective in preventing reverse rotation of the reversible gear, whereby when the crank shaft rotates, the sun gear will, because of the first centrifugal impulse driving means, tend to pick up in speed until it reaches the speed of the centrifugal impulse driving means, and whereby, when the sun gear is driven, the reversible gear held against reverse rotation, and the planetary gearing freed for rotation, the planetary gearing may be positively driven at a lower speed than the sun gear if the reversible gear is stationary and whereby the second centrifugal impulse driving means will tend to cause the reversible gear to pick up in speed until it reaches the speed of the planetary gearing, and hence of the sun gear, and whereby, when the crank shaft and sun gear are decelerated, the second centrifugal impulse driving means will exert a decelerating action on the planetary gearing, and hence of the reversible gear, which decelerating action decreases as the speed of the planetary gearing decreases, whereby a modified free-wheeling of the planetary gearing, and reversible gear, is obtained and whereby, when the sun gear is driven, the reversible gear freed for reverse rotation, and the planetary gearing held against reverse rotation, the reversible gear will be positively driven in a reverse direction at a lower speed than the sun gear, said first overrunning clutch means comprising a member having a spiral engagement with respect to the sun gear and coaxial therewith.

4. An automobile transmission for use between the crank shaft of an internal combustion engine and the propeller shaft, comprising centrifugal impulse driving means, including a driving member rotatable with the crank shaft having a driving action increasing with the engine's speed and a driven member, and having provisions for preventing the driven member from overrunning with respect to the driving member whereby, when the crank shaft decelerates, it will act to retard the driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, a second overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said second overrunning clutch means ineffective in preventing reverse rotation of the reversible gear, whereby when the crank shaft rotates, the sun gear will, because of the first centrifugal impulse driving means, tend to pick up in speed until it reaches the speed of the centrifugal impulse driving means, and whereby, when the sun gear is driven, the reversible gear held against reverse rotation, and the planetary gearing freed for rotation, the planetary gearing may be positively driven at a lower speed than the sun gear if the reversible gear is stationary and whereby the second centrifugal impulse driving means will tend to cause the reversible gear to pick up in speed until it reaches the speed of the planetary gearing, and hence of the sun gear, and whereby, when the crank shaft and sun gear are decelerated, the second centrifugal impulse driving means will exert a decelerating action on the planetary gearing, and hence of the reversible gear, which decelerating action decreases as the speed of the planetary gearing decreases, whereby a modified free-wheeling of the planetary gearing, and reversible gear, is obtained and whereby, when the sun gear is driven, the reversible gear freed for reverse rotation, and the planetary gearing held against reverse rotation, the reversible gear will be positively driven in a reverse direction at a lower speed than the sun gear, said first overrunning clutch means comprising a member having a spiral engagement with respect to the sun gear and coaxial therewith, and said second overrunning clutch means comprising a member having a spiral engagement with respect to the reversible gear and coaxial therewith.

6. An automobile transmission for use between the crank shaft of an internal combustion engine and the propeller shaft, comprising impulse driving means, a driving member rotatable with the crank shaft having a driving action increasing with the engine's speed and a driven member, a sun gear rotatable with the driven member, a planetary gearing meshing with the sun gear, and a reversible gear meshing with said planetary gearing, the transmission between the planetary gearing and the reversible gear including a second impulse driving means having a driving action on the reversible gear varying with the speed of the planetary gearing.

7. An automobile transmission for use between the crank shaft of an internal combustion engine and the propeller shaft, comprising inertia impulse driving means, including a driving member rotatable with the crank shaft having a driving action increasing with the engine's speed and a driven member, a sun gear rotatable with the driven member, a planetary gearing meshing with the sun gear, a reversible gear meshing with said planetary gearing, the transmission between the planetary gearing and the reversible gear including a second inertia impulse driving means having a driving action on the reversible gear varying with the speed of the planetary gearing, and overrunning clutch means permitting forward rotation of the reversible gear but preventing reverse rotation thereof whereby forward impulses on the reversible gear are rendered effective and reverse impulses are rendered ineffective.

8. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, and a reversible gear meshing with said planetary gearing, the transmission between the planetary gearing and the reversible gear including a second centrifugal impulse driving means having a driving action on the reversible gear varying with the speed of the planetary gearing.

9. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, and a second overrunning clutch means permitting forward rotation of the reversible gear but preventing reverse rotation thereof whereby forward impulses on the reversible gear are rendered effective and reverse impulses are rendered ineffective.

10. An automobile transmission for use between the crank shaft of an internal combustion engine and the propeller shaft, comprising a sun gear, a planetary gearing meshing with the sun gear, a reversible gear meshing with said planetary gearing, the transmission between the planetary gearing and the reversible gear including centrifugal impulse driving means having a driving action on the reversible gear varying with the speed of the planetary gearing, overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said overrunning clutch means ineffective in preventing reverse rotation of the reversible gear, said overrunning clutch means comprising a member having a spiral engagement with respect to the reversible gear and coaxial therewith and movable axially with respect thereto.

11. An automobile transmission for use between the crank shaft of an internal combustion engine and the propeller shaft, comprising centrifugal impulse driving means, including a driving member rotatable with the crank shaft having a driving action increasing with the engine's speed and a driven member, and having provisions for preventing the driven member from overrunning with respect to the driving member whereby, when the crank shaft decelerates, it will act to retard the driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, a second overrunning clutch means permitting forward rotation of the reversible gear but preventing reverse rotation thereof whereby forward impulses on the reversible gear are rendered effective, and reverse impulses are rendered ineffective, and means for holding said planetary gearing against rotation and rendering said second overrunning clutch means ineffective in preventing reverse rotation of the reversible gear, whereby when the crank shaft rotates the sun gear will, because of the first centrifugal impulse driving means, tend to pick up in speed until it reaches the speed of the centrifugal impulse driving means, and whereby, when the sun gear is driven, the reversible gear held against reverse rotation, and the planetary gearing freed for rotation, the planetary gearing may be positively driven at a lower speed than the sun gear if the reversible gear is stationary and whereby the second centrifugal impulse driving means will tend to cause the reversible gear to pick up in speed until it reaches the speed of the planetary gearing, and hence of the sun gear, and whereby, when the crank shaft and sun gear are decelerated, the second centrifugal impulse driving means will exert a decelerating action on the planetary gearing, and hence of the reversible gear, which decelerating action decreases as the speed of the planetary gearing decreases, whereby a modified free-wheeling of the planetary gearing, and reversible gear, is obtained and whereby, when the sun gear is driven, the reversible gear freed for reverse rotation, and the planetary gearing held against reverse rotation, the reversible gear will be positively driven in a reverse direction at a lower speed than the sun gear, said first overrunning clutch means comprising a member having a spiral engagement with respect to the sun gear and coaxial therewith and movable axially with respect thereto.

12. An automobile transmission for use between the crank shaft of an internal combustion engine and the propeller shaft, comprising centrifugal impulse driving means, including a driving member rotatable with the crank shaft having a driving action increasing with the engine's speed and a driven member, and having provisions for preventing the driven member from overrunning with respect to the driving member whereby, when the crank shaft decelerates, it will act to retard the driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, a second overrunning clutch means permitting forward rotation of the reversible gear but preventing reverse rotation thereof whereby forward impulses on the reversible gear are rendered effective and reverse impulses are rendered ineffective, and means for holding said planetary gearing against rotation and rendering said second overrunning clutch means ineffective in preventing reverse rotation of the reversible gear, whereby when the crank shaft rotates the sun gear will, because of the first centrifugal impulse driving means, tend to pick up in speed until it reaches the speed of the centrifugal impulse driving means, and whereby, when the sun gear is driven, the reversible gear held against reverse rotation, and the planetary gearing freed for rotation, the planetary gearing may be positively driven at a lower speed than the sun gear if the reversible gear is stationary and whereby the second centrifugal impulse driving means will tend to cause the reversible gear to pick up in speed until it reaches the speed of the planetary gearing, and hence of the sun gear, and whereby, when the crank shaft and sun gear are decelerated, the second centrifugal impulse driving means will exert a decelerating action on the planetary gearing, and hence of the reversible gear, which decelerating action decreases as the speed of the planetary gearing decreases, whereby a modified free-wheeling of the planetary gearing, and reversible gear, is obtained and whereby, when the sun gear is driven, the reversible gear freed for reverse rotation, and the planetary gearing held against reverse rotation, the reversible gear will be positively driven in a reverse direction at a lower speed than the sun gear, said second overrunning clutch means comprising a member having a spiral engagement with respect to the reversible gear and coaxial therewith and movable axially with respect thereto.

13. An automobile transmission for use between the crank shaft of an internal combustion engine and the propeller shaft, comprising centrifugal impulse driving means including a driving member rotatable with the crank shaft having a driving action increasing with the engine's speed and a driven member, a second centrifugal impulse driving means, including a second rotatable driving member having a driving action increasing with its speed, and a second driven member, said second driving member being driven by said first driven member, and overrunning clutch means permitting forward rotation of said second driven member but preventing reverse rotation thereof, whereby forward impulses on said second driven member are rendered effective and reverse impulses ineffective and whereby increased torque on the second driven member is obtained.

14. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, a reversible gear meshing with said planetary gearing, the transmission between the planetary gearing and the reversible gear, including a second centrifugal impulse driving means having a driving action on the reversible gear varying with the speed of the planetary gearing, overrunning clutch means permitting forward rotation of the reversible gear but preventing reverse rotation thereof whereby forward impulses on the reversible gear are rendered effective and reverse impulses are rendered ineffective, said overrunning clutch means comprising a dog pivotally mounted with respect to the reversible gear for preventing rotation thereof in one direction only.

15. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, and a reversible gear meshing with said planetary gearing, the transmission between the planetary gearing and the reversible gear including a second centrifugal impulse driving means having a driving action on the reversible gear varying with the speed of the planetary gearing, said overrunning clutch means comprising a dog pivotally mounted with respect to the reversible gear for preventing rotation thereof in one direction only.

16. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, a reversible gear meshing with said planetary gearing, the transmission between the planetary gearing and the reversible gear including a second centrifugal impulse driving means having a driving action on the reversible gear varying with the speed of the planetary gearing, and a second overrunning clutch means permitting forward rotation of the reversible gear but preventing reverse rotation thereof whereby forward impulses on the reversible gear are rendered effective and reverse impulses are rendered ineffective, said first overrunning clutch means comprising a dog pivotally mounted with respect to the reversible gear for preventing rotation thereof in one direction only.

17. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, overrunning clutch means permitting forward rotation of the sun gear but preventing reverse rotation thereof whereby forward impulses on the sun gear are rendered effective and reverse impulses ineffective, and a reversible gear meshing with said planetary gearing, the transmission between the planetary gearing and the reversible gear including a second centrifugal impulse driving means having a driving action on the reversible gear varying with the speed of the planetary gearing, said overrunning clutch means comprising means acting between the sun gear and planetary gear for preventing reverse rotation of the sun gear with respect to the planetary gearing.

18. In an infinitely variable speed transmission, the combination of planetary gear sets coupled in series, each having counterweighted planets and one-way clutches, said one-way clutches being arranged to act as no-back members, to allow slow rotation of the engine and to automatically act as reactance members to absorb frequent negative impulses at an infinite number of positions during intermediate speeds, when the engine is turning faster than the members controlled by said one-way clutches, and a yieldable member interposed between one of said one-way clutches and a stationary member.

19. An automobile transmission for use between the crank shaft of an internal combustion engine and the propeller shaft, comprising impulse driving means, a driving member rotatable with the crank shaft having a driving action increasing with the engine's speed and a driven member, a sun gear rotatable with the driven member, a planetary gearing meshing with the sun gear, and a reversible gear meshing with said planetary gearing, the transmission between the planetary gearing and the reversible gear including a second impulse driving means having a driving action on the gearing.

20. An automobile transmission for use between the crank shaft of an internal combustion engine and the propeller shaft, comprising inertia impulse driving means, including a driving member rotatable with the crank shaft having a driving action increasing with the engine's speed and a driven member, a sun gear rotatable with the driven member, a planetary gearing meshing with the sun gear, a reversible gear meshing with said planetary gearing, the transmission between the planetary gearing and the reversible gear including a second inertia impulse driving means having a driving action on the reversible gear varying with the speed of the planetary gearing, and over-running clutch means permitting forward rotation of the reversible gear but preventing reverse rotation thereof whereby forward impulses on the reversible gear are rendered effective and reverse impulses are rendered ineffective.

21. In an automobile transmission the combination of a mass inertia impulse transmission comprising a rotating mass pivoted eccentric to the main axes and reactance means discharging the negative impulses, incident to the eccentrically revolving mass, into a fixed member, and, in axial alignment a second inertia impulse transmission connected in series with the first, the second transmission comprising a reverse gear, counterweighted planet gears and a sun gear, and one way reactance means for carrying the negative impulses into a fixed member.

22. An automobile transmission for use between the crank shaft of an internal combustion engine and the propeller shaft, comprising centrifugal impulse driving means including a driving member rotatable with the crank shaft having a driving action increasing with the engine's speed and a driven member, a sun gear rotatable with the driven member, a planetary gearing meshing with the sun gear, and a reversible gear meshing with said planetary gearing, the transmission between the planetary gearing and the reversible gear including a second centrifugal impulse driving means having a driving action on the reversible gear varying with the speed of the planetary gearing.

23. An automobile transmission for use between the crank shaft of an internal combustion engine and the propeller shaft, comprising centrifugal impulse driving means including a driving member rotatable with the crank shaft having a driving action increasing with the engine's speed and a driven member, a sun gear rotatable with the driven member, a planetary gearing meshing with the sun gear, a reversible gear meshing with said planetary gearing, the transmission between the planetary gearing and the reversible gear including a second centrifugal impulse driving means having a driving action on the reversible gear varying with the speed of the planetary gearing, and overrunning clutch means permitting forward rotation of the reversible gear but preventing reverse rotation thereof whereby forward impulses on the reversible gear are rendered effective and reverse impulses are rendered ineffective.

24. An automobile transmission for use between the crank shaft of an internal combustion engine and the propeller shaft, comprising centrifugal impulse driving means, including a driving member rotatable with the crank shaft having a driving action increasing with the engine's speed and a driven member, and a second centrifugal impulse driving means including a second rotatable driving member having a driving action increasing with its speed, and a second driven member, said second driving member being driven by said first driven member, and a one-way clutch of an infinite station type associated with said driven member to absorb the negative impulses, and to act as a back stop during positive low gear ratios.

25. An automobile transmission for use between the crank shaft of an internal combustion engine and the propeller shaft, comprising centrifugal impulse driving means, including a driving member rotatable with the crank shaft having a driving action increasing with the engine's speed and a driven member, a second centrifugal impulse driving means including a second rotatable driving member having a driving action increasing with its speed, and a second driven member, said second driving member being driven by said first driven member, and overrunning clutch means permitting forward rotation of said second driven member but preventing reverse rotation thereof, whereby forward impulses on said second driven member are rendered effective and reverse impulses ineffective and whereby increase torque on the second driven member is obtained.

26. An automobile transmission for use between the crank shaft of an internal combustion engine and the propeller shaft, comprising centrifugal impulse driving means, including a driving member rotatable with the crank shaft having a driving action increasing with the engine's speed and a driven member, a sun gear rotatable with the driven member, a planetary gearing meshing with the sun gear, a reversible gear meshing with said planetary gearing, the transmission between the planetary gearing and the reversible gear including a second centrifugal impulse driving means having a driving action on the reversible gear varying with the speed of the planetary gearing, overrunning clutch means permitting forward rotation of the reversible gear but preventing reverse rotation thereof whereby forward impulses on the reversible gear are rendered effective and reverse impulses are rendered ineffective, said overrunning clutch means comprising a dog pivotally mounted with respect to the reversible gear for preventing rotation thereof in one direction only.

27. In an infinitely variable speed transmission, the combination of planetary gear sets coupled in series, each having counterweighted planets rotatable to give alternate positive and negative impulses, and one-way clutches arranged between a moving and stationary part of said transmission to absorb the negative impulses, said one-way clutches being arranged to act as no-back members to allow slow rotation of the engine and to automatically act as reactance members to absorb frequent negative impulses at an infinite number of positions during intermediate speeds, when the engine is turning faster than the members controlled by the one-way clutches.

ADIEL Y. DODGE.